United States Patent

Motoba et al.

[11] Patent Number: 5,989,430
[45] Date of Patent: Nov. 23, 1999

[54] METHOD FOR ELUTING ANTIMONY ADSORBED ON CHELATING RESIN

[75] Inventors: Kazuhiko Motoba; Katutoshi Narita, both of Ibaraki, Japan

[73] Assignee: Nippon Mining & Metals Co., Ltd., Tokyo, Japan

[21] Appl. No.: 09/107,327

[22] Filed: Jun. 30, 1998

[30] Foreign Application Priority Data

Jun. 30, 1997 [JP] Japan .................................... 9-174541

[51] Int. Cl.⁶ .................................................. B01D 15/04
[52] U.S. Cl. ......................... 210/634; 210/638; 210/670; 210/688; 205/586; 205/705; 423/87
[58] Field of Search .................................. 210/634, 638, 210/688, 670; 423/87; 205/586, 705

[56] References Cited

U.S. PATENT DOCUMENTS

| | | | |
|---|---|---|---|
| 4,559,216 | 12/1985 | Nagai | 210/688 |
| 5,316,679 | 5/1994 | Bruening | 210/634 |
| 5,332,420 | 7/1994 | Cupertino | 75/710 |
| 5,364,452 | 11/1994 | Cupertino | 75/710 |
| 5,366,715 | 11/1994 | Dreisinger | 423/531 |

FOREIGN PATENT DOCUMENTS

| | | | |
|---|---|---|---|
| 61-17423 | 1/1986 | Japan | 210/634 |
| 8-253825 | 10/1996 | Japan | 210/634 |

OTHER PUBLICATIONS

W.C. Cooper, et al., Hydrometallurgy and Electrometallurgy of Copper, vol. III, pp. 246–254 (Aug. 18–21, 1991.

*Primary Examiner*—Ernest G. Therkorn
*Attorney, Agent, or Firm*—Birch, Stewart, Kolasch & Birch, LLP

[57] ABSTRACT

In a method for recovering antimony from the electrolyte of copper electro-refining process, the antimony is adsorbed on the chelating resin and is then eluted by acid. The eluate is then neutralized to recover antimony. In a conventional method, a large amount of acid and alkali is used. In the inventive eluting method, the antimony concentration in the acidic eluting solution is adjusted to 4 g/L or more in the first step and 3 g/L or less in the second step.

9 Claims, 4 Drawing Sheets

METHOD FOR ELUTING ANTIMONY ADSORBED ON CHELATING RESIN

BACKGROUND OF INVENTION

1. Field of Invention

The present invention is related to a method for eluting antimony, which has been adsorbed on the chelating resin, thereby separating antimony from the chelating resin and hence recovering antimony. More particularly, the present invention is related to a purification method of an antimony-containing electrolyte from the copper refining process and the like, so as to recover the antimony from such electrolyte.

2. Description of Related Art

In the copper refining process, in which the electrolyte is subjected to deposition of copper, antimony is left in the electrolyte and is then removed from the electrolyte by, for example, ion-exchanging using a chelating resin, a functional group of which is aminophosphonic acid.

A method for removal and recovery of antimony from the chelating resin, is illustrated in the flow chart shown in FIG. 1 with the following reference numerals: 1—concentrated hydrochloric acid tank; 2—acid-conditioning tank; 3—acid feed-tank; 4—chelating-resin tower; 4a—chelating resin; 5—neutralizing tank; and, 6—filter press.

The concentrated hydrochloric acid from tank 1 and the liquor from the chelating resin tower 4, described in detail hereinafter, are mixed in the acid-conditioning tank 2, where the HCl concentration is adjusted to approximately 6N (c.f. ④). The hydrochloric acid solution with adjusted concentration is then once stored in the acid feed-tank 3 and is then passed through the chelating-resin tower 4. The hydrochloric acid, as eluting solution, is caused to react with the chelating resin 4a, on which the antimony has been adsorbed. The antimony is thus eluted in the form of $SbCl_3$ (c.f. ②). The eluted antimony is brought into contact with an alkali such as $Ca(OH)_2$ in the neutralizing tank 5 to convert $SbCl_3$ to $Sb(OH)_3$, which is then subjected to the filter press 6 (c.f. ③).

Referring to FIG. 2, the relationship between the eluting time and the antimony concentration of the eluate is shown. As is shown in FIG. 2, most of the antimony is eluted from the chelating-resin tower 4 at the initial eluting stage. The eluate with high Sb-concentration yielded in the initial eluting period is transferred to and neutralized in the neutralizing tank 5 and is then subjected to the recovery stage of $Sb(OH)_3$. Meanwhile, the eluate with low Sb-concentration yielded in the subsequent period is not neutralized but is transferred into the acid-conditioning tank 2 and is mixed with concentrated hydrochloric acid. The resultant mixture is re-used as the eluting acidic solution, as described above. The initial and subsequent eluting treatments are carried out, as described above, while leaving some portion of the eluate in the chelating-resin tower 4. This remaining eluate is air-purged and, then, the chelating resin 4a is scrubbed or washed with water. The air-purged and hence removed eluate and a portion of the scrubbing water are recovered to re-use for the acid-conditioning. The other portion of the scrubbing water is exhausted as waste liquor outside the liquor purification system shown in FIG. 1.

SUMMARY OF INVENTION

In the conventional method, a disadvantgeously large amount of hydrochloric acid and an alkali such as calcium hydroxide must be used. It is advisable to reduce the amount of the eluate yielded in the earlier stage or to reduce the concentration of hydrochloric acid in the eluting solution, in order to eliminate the disadvantages mentioned above. However, when any one of such reduction steps is applied in the conventional method, the eluting ratio is disadvantageously decreased.

The removal degree of antimony from the chelating resin is expressed by the following eluting ratio.

$$\text{The eluting ratio} = A/B \times 100 \ (\%) \quad (1)$$

A=eluate amount of antimony from the chelating resin

B=adsorbing amount of antimony on the chelating resin before elution

Figure 1:
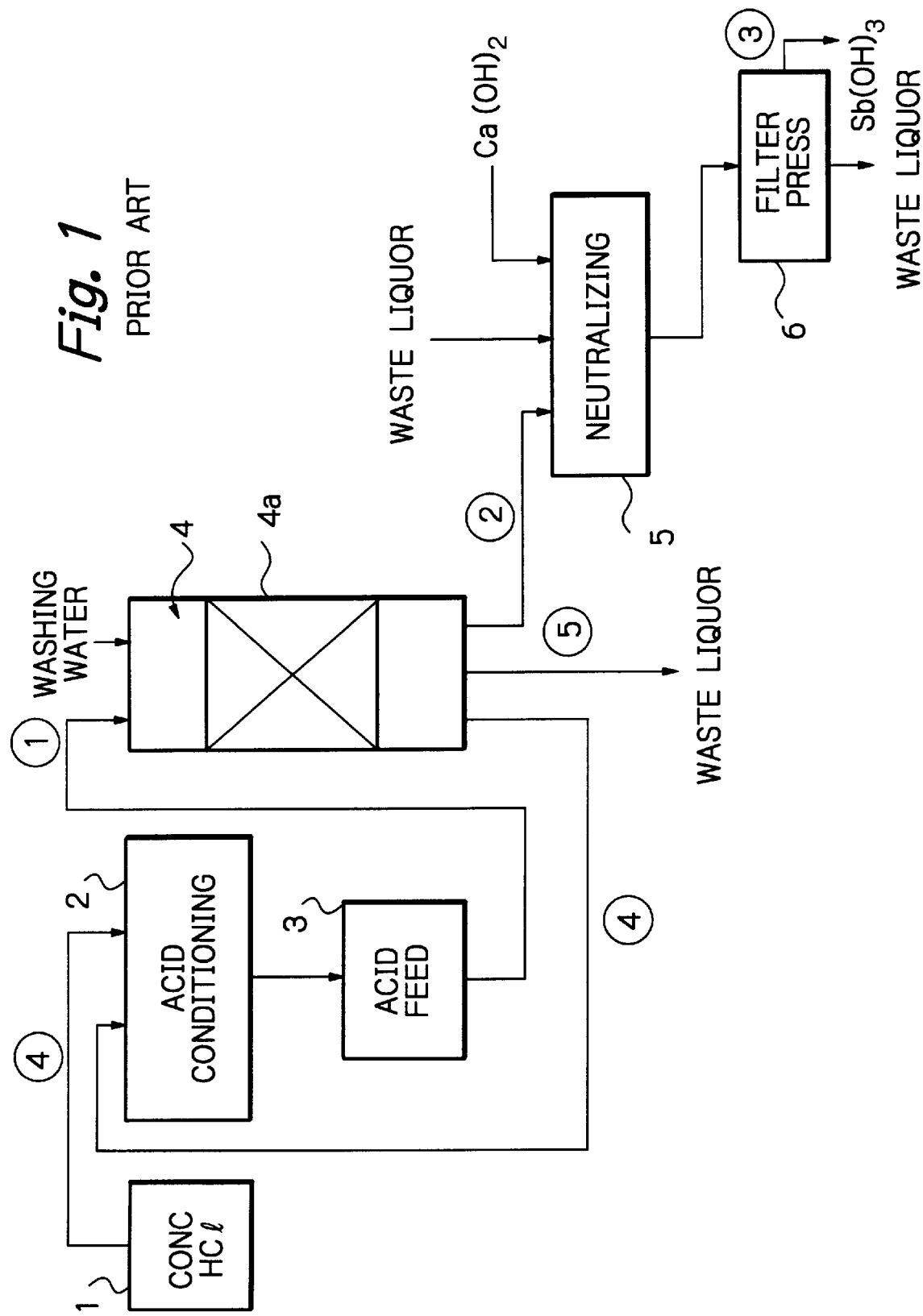
FIG. 1 illustrates a flow chart of a conventional eluting method of the antimony-adsorbed on the chelating resin.
Figure 2:
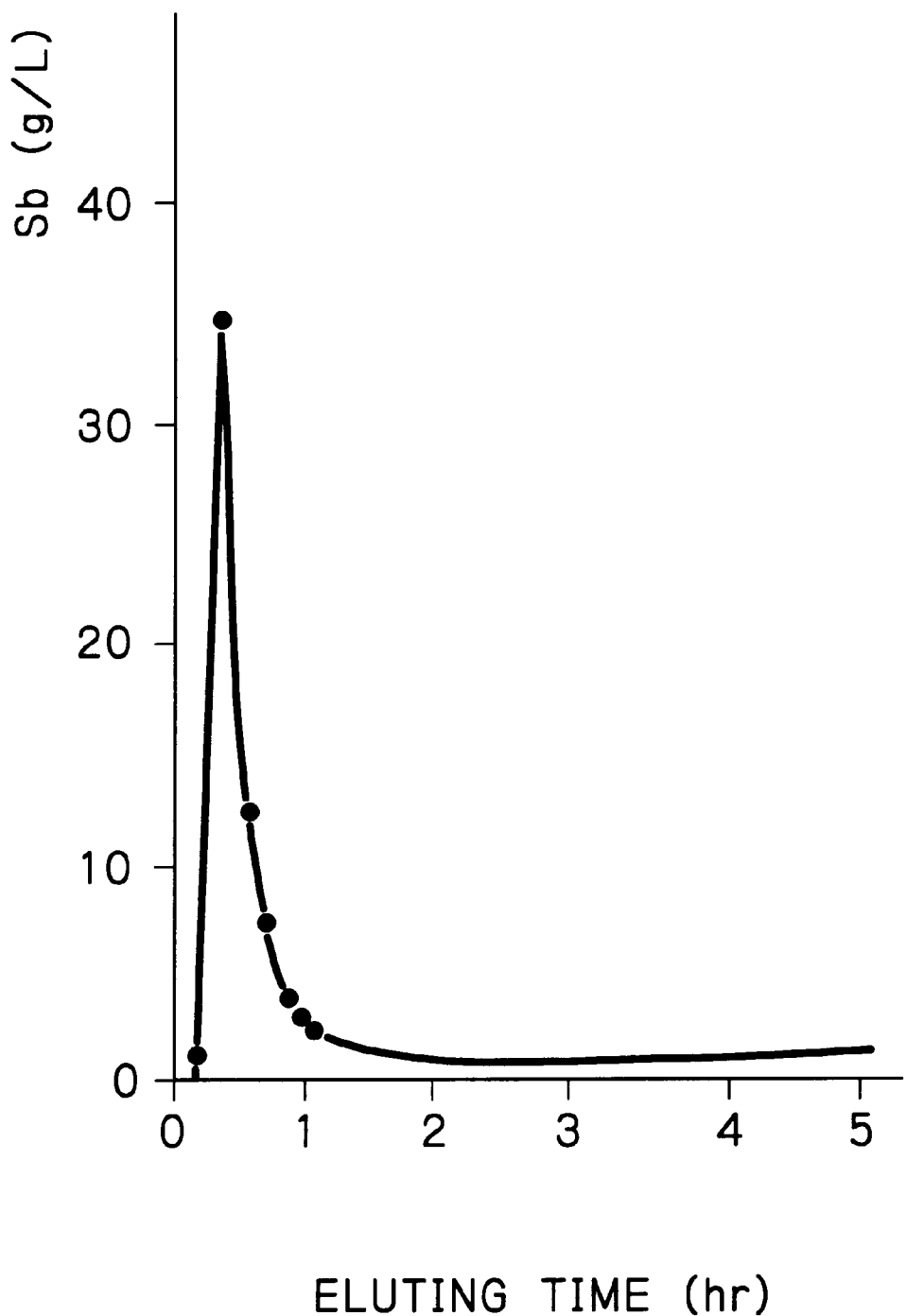
FIG. 2 is a graph showing sequential change of the Sb concentration in the eluate obtained as a result of flowing the acidic eluting solution through chelating resin at a rate of 50 L/min (SV=2).

As is shown in FIG. 2, most of antimony is eluted from the chelating resin in the initial eluting stage. The initial eluate having high antimony concentration is neutralized (c.f. ② in FIG. 1). The subsequent eluate is recovered and its acid concentration is controlled to re-use as the acidic eluting solution (④ in FIG. 1). A minor amount of antimony is gradually incorporated into the re-used acidic eluting solution, until the antimony concentration arrives at the equilibrium. The equilibrium antimony concentration (a) is dependent upon the proportion of the amount (x) of the initial eluate subjected to neutralization and the amount (y) of the subsequent eluate not subjected to the neutralization. More specifically, when the ratio x/y is high, the amount of antimony incorporated from the chelating resin becomes small and the antimony concentration (a) becomes low. For example, the eluting solution, which contains 219 g/L of hydrochloric acid, is passed at a rate of 3 $m^3$/hr for 5 hours through the chelating resin (1.5 $m^3$), on which 23 g/L of antimony has been adsorbed. 28% of the eluate obtained in the initial period (x) is neutralized, while 72% of the eluate obtained in subsequent period (y) is not neutralized but is recovered and re-used repeatedly until the equilibrium state, where the antimony concentration (a) in the eluting solution is 3 g/L.

Figure 3:
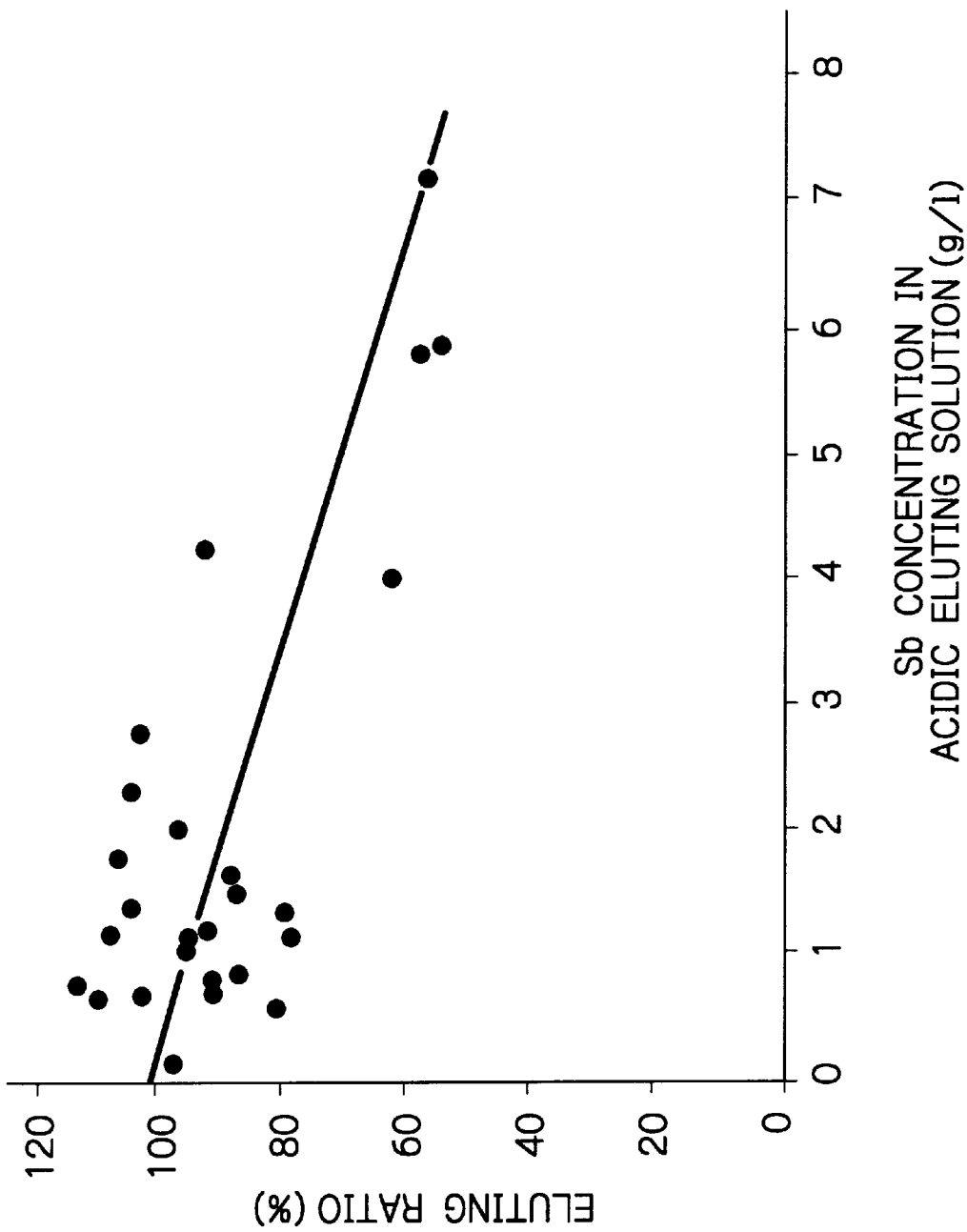
FIG. 3 is a graph showing the relationship between the eluting ratio and the Sb concentration of the eluting solution prior to the reaction with chelating resin.

In the conventional method described above, the acidic eluting solution contains a small amount of antimony, for example approximately 3 g/L. The eluting ratio is influenced by the antimony concentration of the acidic eluting solution, which is to be brought into contact with the chelating resin, as shown in FIG. 3. The eluting ratio is higher as the antimony concentration of the acidic eluting solution is lower. In the conventional method, the eluting ratio is high because the antimony concentration in the acidic eluting solution is low.

The present inventors carried out experiments how to use the phenomena illustrated in FIGS. 2 and 3, for the purpose of decreasing the amount of acid and alkali used in the elution method of antimony from the chelating resin.

It is, therefore, an object of the present invention to provide a method for eluting antimony adsorbed on chelating resin, in which the amounts of hydrochloric acid used as the eluent and the alkali used for precipitating the antimony hydroxide are dramatically decreased, thereby reducing the cost of liquid purification.

In accordance with the objects of the present invention, there is provided a method for eluting antimony adsorbed on chelating resin, comprising the steps of:

bringing a first solution, which contains antimony, into contact with the chelating resin, thereby adsorbing antimony on the chelating resin;

bringing an acidic eluting solution into contact with the chelating resin, thereby eluting antimony from the chelating resin and obtaining a first eluate; and, neutralizing at least of portion of said first eluate, thereby precipitating antimony hydroxide, said eluting comprises the following steps:

a first step of using a first acidic eluting solution which contains not less than approximately 4 g/l of antimony, thereby obtaining a second eluate, at least a portion of which is subjected to the neutralization; and, a subsequent second step of using a second acidic eluting solution which contains not more than approximately 3 g/l of antimony, thereby obtaining a third eluate.

In the first eluting step, since the antimony concentration in the first acidic eluting solution is high before the elution, the eluting ratio tends to be low (c.f. FIG. 3), while the antimony concentration in the eluate, i.e., the post-eluting solution, in the first step is high (c.f., FIG. 2). By means of transferring such solution to neutralization, the amount of neutralization liquor, can therefore be reduced. In the second eluting step, because the antimony concentration in the second acidic eluting solution is low, the elution ratio is high such as to attain a high level of elution in the overall process.

In the present invention, the neutralizing liquor can be advantageously lessened by setting the antimony concentration in the first step to approximately 4 g/l or more. In addition, the antimony concentration in the second step is set to approximately 3 g/l or less to attain the eluting ratio of 70% or more.

According to a preferred embodiment of the present invention, a portion of the second eluate not subjected to the neutralization is supplied to the first step as at least a portion of the first acidic eluting solution.

According to another preferred embodiment of the present invention, at least a portion of the third eluate is supplied to the first step as the first acidic eluting solution and/or the second step as the second acidic eluting solution.

DESCRIPTION OF PREFERRED EMBODIMENTS

Figure 4:
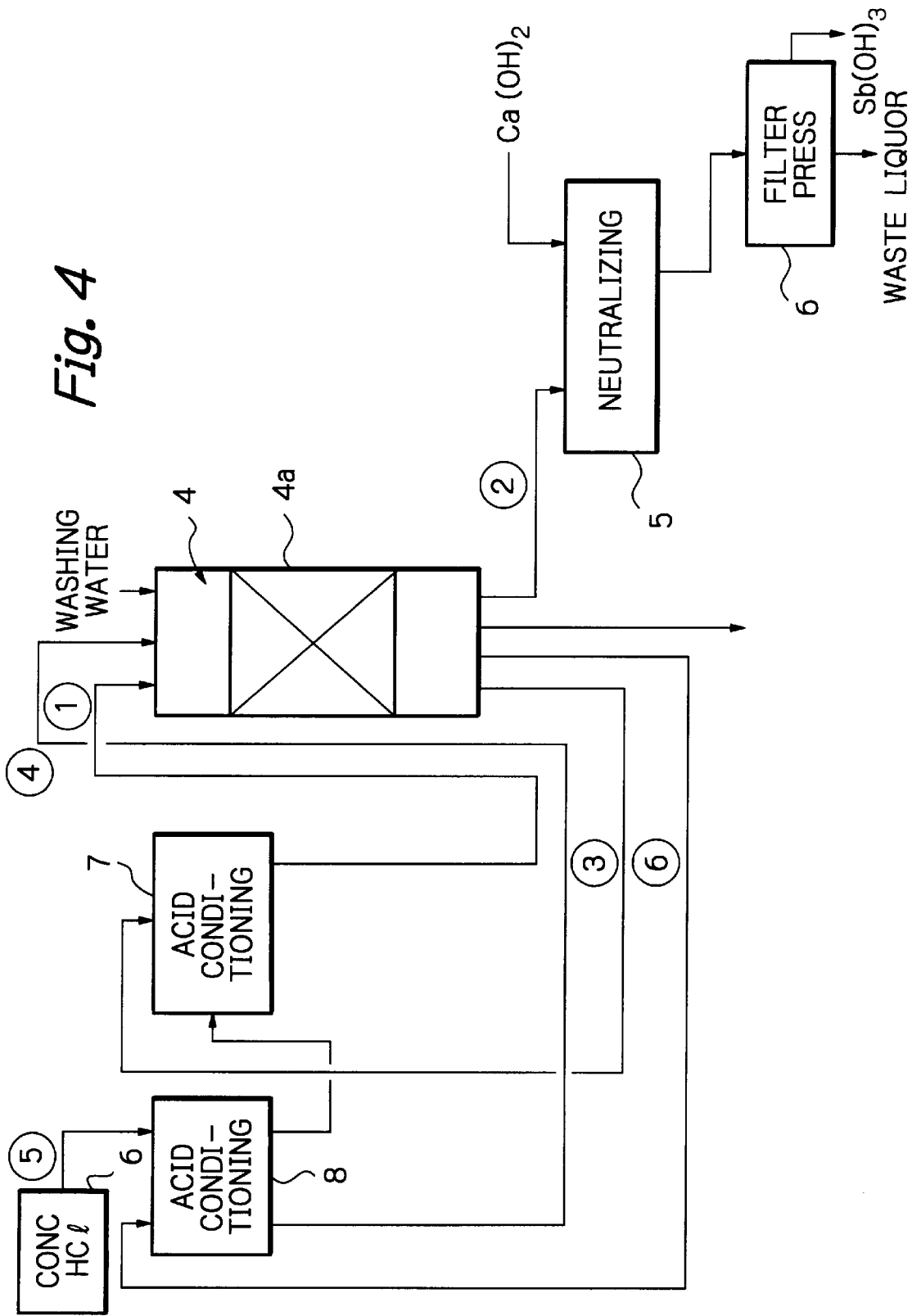
FIG. 4 is a flow chart illustrating an embodiment of the eluting method of the antimony adsorbed on the chelating resin according to the present invention.

In FIG. 4, the same equipment as in FIG. 1 is denoted by the same reference numerals. The eluting flow chart illustrated in FIG. 4 is fundamentally different from FIG. 1 in the installation of two tanks, i.e., the acid-conditioning tank 7 for the first eluting step (below "the first acid-conditioning tank 7") and the acid conditioning tank 8 for the second eluting step (below "the second acid-conditioning tank 8"). The first acidic eluting solution, which contains approximately 4 g/l or more of antimony, is stored in the first acid-conditioning tank 7 and is then fed from there into the chelating-resin tower 4 (c.f. ①). Meanwhile, the eluate from the chelating-resin tower 4 (e.g., the third eluate 6) and a portion of scrubbing water as well as the concentrated hydrochloric acid from tank 1 are fed into the second acid-conditioning tank 8, thereby providing the second acidic eluting solution with approximately 3 g/l or less of antimony concentration. The first and second acid-conditioning tanks 7 and 8, respectively, are selectively communicated with the chelating-resin tower 4 by means of operating valves (not shown). The respective eluate of the first and second steps is circulated, witout being intermixed with the eluate of the other step. The eluate (third eluate) has a relatively high antimony concentration, when it is yielded in an earlier portion of the second step. Such eluate is used as the first acidic eluting solution. The concentrated hydrochloric acid may not required to be newly added to the first acidic eluting solution. In this case, the amount of hydrochloric acid used can be advantageously lessened.

Referring again to FIG. 4, the first acidic eluting solution, which contains high concentration of antimony, is fed from tank 7 into the chelating-resin tower 4 so as to elute antimony which has been adsorbed on the chelating resin 4a (c.f. ①). The resultant eluate (second eluate), the antimony concentration of which is preferably 10 g/L or more, more preferably 12 g/L or more, is fed to the neutralization tank 5, where most of the antimony is neutralized (c.f. ②). The resultant antimony hydroxide is subjected to the filter press 6. The elution is further continued in such a manner that the resultant eluate is not neutralized in the neutralizing tank 5 but is recovered in the first acid-conditioning tank 7 as the un-neutralized eluate (c.f. ③). The first step comprises the treatments as described above.

Next, in the second step, the second acidic eluting solution, the antimony concentration of which is low, for example 1 g/L or less, and which has been stored in the second acid-conditioning tank 8, is fed into the chelating-resin tower 4. The eluate (third eluate), which is yielded in an earlier stage of the second step, is recovered in the first acid-conditioning tank 7. On the other hand, the eluate, which is yielded in a later stage of the second step, is recovered in the second acid-conditioning tank 8 (c.f. ⑥). The eluate, which may be left in the chelating-resin tower 4, is air-purged as in the conventional method. The chelating resin 4a is then washed with water. The air-purged and water-washed eluates is recovered. All or a part of the recovered eluates are re-used as the acidic eluting solution (c.f. 6). Volume proportion of the first acidic eluting solution to the second acidic eluting slution is preferably 100: from 20 to 100.

As is described hereinabove, the eluting ratio is low in the first step, where most of the antimony contained in the aqueous solution, e.g., the electrolyte of the copper refining process, is eluted, because the antimony concentration in the eluting solution is as high as approximately 4 g/L or more. The eluting ratio in all the steps can be kept as high as in the conventional method, because the antimony concentration in the second step is very low. The amounts of antimony in the respective steps are given in the following table.

TABLE 1

|  | Conventional Method |  | Inventive Method |
|---|---|---|---|
| Amount of antimony contained in the acidic eluting solution in the first step (before elution) | small | < | large |
| Amount of antimony eluted from chelating resin in the first step | large | > | small |
| Amount of antimony contained in the acidic eluting solution in the second | small |  | small |

TABLE 1-continued

| | Conventional Method | | Inventive Method |
|---|---|---|---|
| step (before elution) | | | |
| Amount of antimony eluted from chelating resin in the second step | small | < | large |
| Amount of Sb recovered in the entire process | | Same | |

It will be apparent from Table 1 why the amount of antimony recovered in the inventive method can be made as high as in the conventional method. In addition, since the antimony contained in the first acidic eluting solution is transferred to the eluate (second eluate) and is also neutralized in the neutralizing step, the amount of antimony recovered becomes correspondingly high. Incidentally, the conventional method is illustrated with reference to FIG. 1 hereinabove.

The small elution amount of antimony in the first step according to the present invention does not incur any problem with regard to recovery of the antimony but is advantageous in no necessity to attain a high elution degree, which then leads to reducing the amount of liquor fed to the neutralizing step and, hence, amount of alkali required for the neutralization.

The present invention is described hereinafter by way of examples.

EXAMPLES

Example 1

The inventive method was carried out as in the flow chart shown in FIG. 4.

The electrolyte from the copper electrolysis process used as the starting solution (first solution) contained 0.5 g/L of Sb, 45 g/L of Cu, 5 g/L of As, 15 g/L of Ni, 0.2 g/L of Bi and 200 g/L of $H_2SO_4$. The chelating resin 4a (60 m$^3$ in total) had aminophosphonic acid as a functional group. The adsorbing operation was carried out to attain the adsorbing amount of Sb amounting to 25 g/L-R (resin).

The acidic solution having 6N of hydrochloric-acid concentration was passed through the chelating resin 4a at a rate twice per hour in the same volume as that of chelating resin 4a. The total amount of the acidic solution was adjusted to 3.2 times and 8 times as much as the volume of chelating resin 4a in the first and second steps, respectively. The above-mentioned first and second steps were repeated until an equilibrium state was attained, where the antimony concentrations in the solutions prior to entering the chelating-resin tower 4, i.e., the first and second acidic eluting solutions, respectively, were 4.9 g/L and 1.2 g/L, respectively. The first acidic eluting solution was passed through the chelating-resin tower 4 in an amount 3.2 times as high as the volume of chelating resin 4a. The antimony concentration in the chelating resin 4a attained was 5 g/L-R and the elution ratio was 80%. The eluate (second eluate) in the initial stage of the first step, having a volume 1.7 times as high as the volume of chelating resin 4a was subjected to neutralization by using $Ca(OH)_2$. The resultant antimony hydroxide was recovered. The remaining eluate (second eluate), the volume of which corresponds to 1.5 times as high as the volume of chelating resin 4a, was not neutralized and recovered in the first acid-conditioning tank 7.

The second acidic eluting solution was passed through the chelating-resin tower 4 in an amount 8 times as high as the volume of chelating resin 4a. Most amount of the eluate (third eluate) was recovered in the second acid-conditioning tank 8. The eluate, the volume of which amounted to 0.6 times as high as the volume of chelating resin 4a, was left in the chelating-resin tower 4 when the second acidic eluting solution was passed through the tower 4. The post water-washing liquor was partly stored in the second acid-conditioning tank 8. The other part 90% was exhausted as waste liquor. The eluate of the second step and the post water-washing liquor stored in the second acid-conditioning tank 8 were mixed and then its concentration of hydrochloric acid was adjusted to 6N.

The amount of $Ca(OH)_2$ used for neutralization is given in Table 2. The amount of concentrated hydrochloric acid used for adjusting the HCl concentration is given in Table 2.

Example 2

The same treatments as in Example 1 were carried out with respect to the chelating resin 4a, the adsorbing amount of which was 39 g/L-R of antimony. The equilibrium antimony concentration in the first and second steps was 9.3 g/L and 2.3 g/L, respectively. The antimony concentration in the resin after the eluting was 8 g/L and the eluting ratio was 79%.

The amount of $Ca(OH)_2$ used for naturalization is given in Table 2. The amount of concentrated hydrochloric acid used for adjusting the HCl concentration is given in Table 2.

Comparative Example

The method illustrated in FIG. 1 was carried out. The acidic solution having 6N of hydrochloric-acid concentration was passed through the chelating resin which had adsorbed 25 g/L of antimony. The amount of acidic solution passed through the chelating resin 4a (60 m$^3$) was 11.3 times as high as the volume of chelating resin 4a, and the passing rate of acidic solution per hour was twice as high as that of the volume of chelating resin 4a. The above treatment was repeated until an equilibrium state was attained, where the antimony concentration in the solution prior to entering the chelating-resin tower 4 was 2.7 g/L.

The resultant acidic eluting solution having 2.7 g/L of antimony concentration was passed through the chelateresin 4a. The antimony concentration in the chelating-resin 4a after the elution was 5 g/L-R, and the elution ratio was 80%. The initial eluate, the volume of which was 2.8 times as much as the volume of chelating resin 4a, was neutralized by $Ca(OH)_2$ and the resultant antimony hydroxide was recovered. The eluate, the volume of which amounted to 0.6 times as high as the volume of chelating resin 4a, was left in the chelating-resin tower 4 when the acidic eluting solution was passed through the tower 4. The post water-washing liquor was partly stored in the acid-conditioning tank 2. The other part 90% was exhausted as waste liquor. The eluate and the post water-washing liquor stored in the acid-conditioning tank 2 were mixed and then its concentration of hydrochloric acid was adjusted.

The amount of $Ca(OH)_2$ used for neutralization is given in Table 2. The amount of concentrated hydrochloric acid used for adjusting the HCl concentration is given in Table 2.

TABLE 2

| Amount (ton) | Example 1 (FIG. 4) | Example 2 (FIG. 4) | Comparative Example (FIG. 1) |
|---|---|---|---|
| $Ca(OH)_2$ | 15.9 | 17.8 | 31.1 |
| HCl | 15.4 | 17.0 | 31.0 |

As is clear in Table 2, the amount of calcium hydroxide and concentrated hydrochloric acid used in the present invention is approximately as low as that of the comparative example.

We claim:

1. A method for eluting antimony adsorbed on chelating resin, comprising the steps of:
    bringing an aqueous solution, which contains antimony, into contact with the chelating resin, thereby adsorbing antimony on the chelating resin;
    bringing an acidic eluting solution into contact with the chelating resin, thereby eluting the antimony from the chelating resin and obtaining a first eluate;
    neutralizing at least a portion of said first eluate, thereby precipitating antimony hydroxide,
    said eluting comprises the following steps:
        a first step of using a first acidic eluting solution which contains not less than approximately 4 g/l of antimony, thereby obtaining a second eluate, at least a portion of which is subjected to the neutralization; and,
        a subsequent second step of using a second acidic eluting solution which contains not more than approximately 3 g/l of antimony, thereby obtaining a third eluate.

2. A method according to claim 1 comprising a step of supplying a portion of said second eluate not subjected to the neutralization, to said first step as at least a portion of said first acidic eluting solution.

3. A method according to claim 2, wherein said first acidic eluting solution consists of said second eluate not subjected to the neutralization.

4. A method according to claim 1 or 2, wherein said second eluate, which is subjected to the neuralization, contains at least 10 g/L of antimony.

5. A method according to claim 1 or 2, wherein a volume proportion of the first acidic eluting solution to the second acidic eluting solution is 100 to from 20:100.

6. A method according to claim 1, comprising a step of supplying at least a portion of said third eluate to the first step as the first acidic eluting solution.

7. A method according to claim 1, comprising a step of supplying at least a portion of said third eluate to the second step as the second acidic eluting solution.

8. A method according to claim 1 comprising a step of supplying at least a portion of said third eluate to the first and second step as the first and second acidic eluting solutions, respectively.

9. A method according to claim 1, 2, 3, 6, 7 or 8, wherein said aqueous solution is an electrolyte from a copper electro-refining process.

* * * * *